(12) United States Patent
Noda et al.

(10) Patent No.: US 10,365,630 B2
(45) Date of Patent: Jul. 30, 2019

(54) CONTROL METHOD OF PROFILE MEASURING APPARATUS

(71) Applicant: MITUTOYO CORPORATION, Kanagawa (JP)

(72) Inventors: Takashi Noda, Tochigi (JP); Hiromi Deguchi, Tochigi (JP); Norihiko Murata, Tochigi (JP)

(73) Assignee: MITUTOYO CORPORATION, Kanagawa (JP)

( * ) Notice: Subject to any disclaimer, the term of this patent is extended or adjusted under 35 U.S.C. 154(b) by 134 days.

(21) Appl. No.: 15/638,932

(22) Filed: Jun. 30, 2017

(65) Prior Publication Data

US 2018/0017954 A1 Jan. 18, 2018

(30) Foreign Application Priority Data

Jul. 14, 2016 (JP) .................................. 2016-139816

(51) Int. Cl.
| | |
|---|---|
| *G01B 21/04* | (2006.01) |
| *G01B 21/20* | (2006.01) |
| *G01B 5/008* | (2006.01) |
| *G05B 19/04* | (2006.01) |
| *G05B 19/401* | (2006.01) |

(52) U.S. Cl.
CPC .......... *G05B 19/401* (2013.01); *G01B 5/008* (2013.01); *G01B 21/04* (2013.01); *G01B 21/042* (2013.01); *G01B 21/20* (2013.01); *G05B 19/041* (2013.01); *G05B 2219/37043* (2013.01); *G05B 2219/37374* (2013.01); *G05B 2219/37411* (2013.01); *Y02P 90/265* (2015.11)

(58) Field of Classification Search
CPC ...... G01B 21/04; G01B 21/042; G01B 21/20; G01B 5/008; G05B 19/041; G05B 19/401
See application file for complete search history.

(56) References Cited

U.S. PATENT DOCUMENTS

| | | |
|---|---|---|
| 7,643,963 B2 | 1/2010 | Noda et al. |
| 9,298,178 B2 | 3/2016 | Noda et al. |
| 9,341,459 B2 | 5/2016 | Noda et al. |
| 9,366,522 B2 | 6/2016 | Noda et al. |

(Continued)

FOREIGN PATENT DOCUMENTS

| | | |
|---|---|---|
| JP | 2008-241420 A | 10/2008 |
| JP | 2013-238573 A | 11/2013 |
| JP | 2014-21004 A | 2/2014 |

*Primary Examiner* — Manuel A Rivera Vargas
*Assistant Examiner* — Yaritza H Perez Bermudez
(74) *Attorney, Agent, or Firm* — Greenblum & Bernstein, P.L.C.

(57) ABSTRACT

A probe displacement command in a scanning measurement is generated according to a composite speed vector V:

$$V = Gf \cdot Vf + Ge \cdot Ve + sp(p) \cdot Gc \cdot Vc2$$

wherein Vf is a vector along which a probe is displaced along a scanning path, Ve is a vector maintaining a deflection amount of the probe toward a work piece at a standard deflection amount. Vc2 is represented by (Vc1·q)q, Vc1 is a vector in a direction correcting a probe position such that a stylus tip is oriented along a scanning course, q is a vector given by a vector product of the normal line of a surface of the work piece and Vf, The normal direction of a measured surface is designated as Nw, p is a scalar product of Vc2 and Nw, and sg(p) is a function returning +1 or -1 in accordance with a value of p.

6 Claims, 16 Drawing Sheets

(56) References Cited

U.S. PATENT DOCUMENTS

| | | |
|---|---|---|
| 9,448,052 B2 | 9/2016 | Noda et al. |
| 9,915,516 B2 * | 3/2018 | Noda ............... G01B 5/008 |
| 2005/0213108 A1 * | 9/2005 | McMurtry ......... G01B 21/045 |
| | | 356/609 |
| 2007/0056176 A1 * | 3/2007 | Matsumiya ......... G01B 7/008 |
| | | 33/551 |
| 2008/0257023 A1 * | 10/2008 | Jordil ............ G01B 21/045 |
| | | 73/105 |
| 2009/0217426 A1 * | 8/2009 | Noda ............... G01B 3/008 |
| | | 850/21 |
| 2010/0174504 A1 * | 7/2010 | Nakagawa ......... G01B 21/045 |
| | | 702/95 |
| 2011/0270562 A1 * | 11/2011 | Ito ................ G01B 11/25 |
| | | 702/94 |
| 2013/0310962 A1 * | 11/2013 | Noda ............... G01B 21/04 |
| | | 700/97 |
| 2016/0341533 A1 * | 11/2016 | Noda ............... G01B 5/008 |
| 2016/0356591 A1 * | 12/2016 | Noda ............... G01B 3/002 |
| 2017/0090455 A1 * | 3/2017 | Noda ............... G01B 7/008 |
| 2017/0115109 A1 | 4/2017 | Noda et al. |

* cited by examiner

Fig. 11
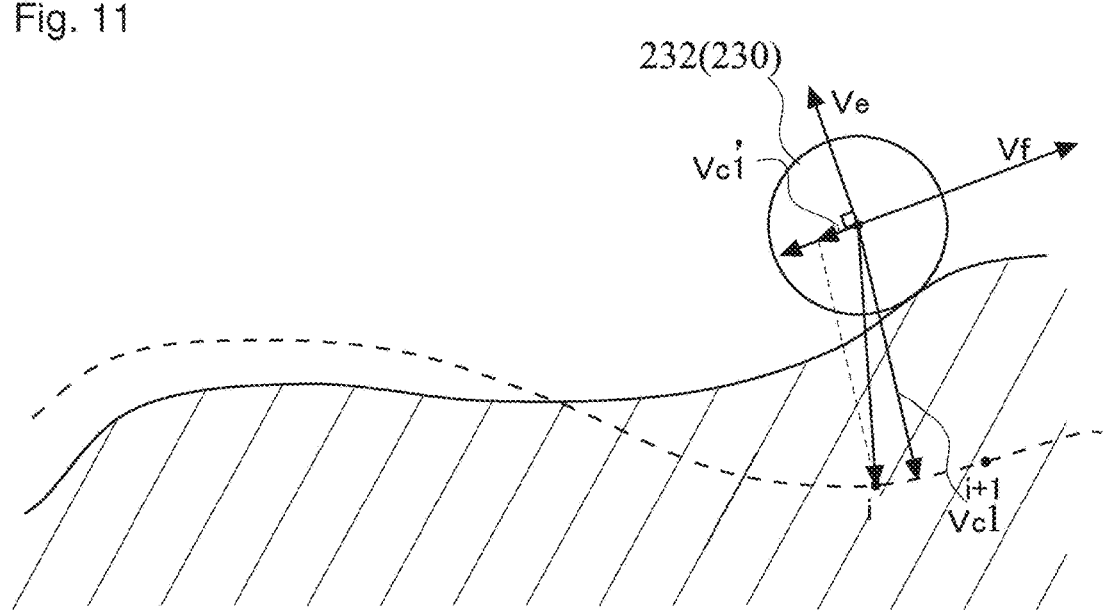
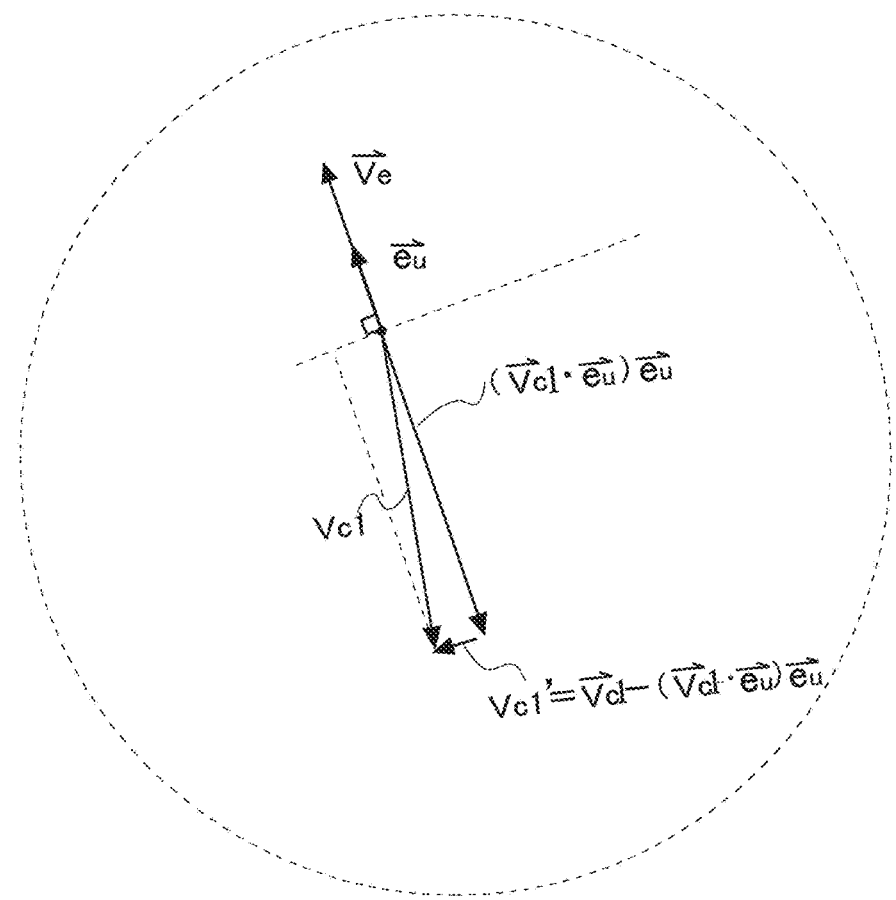

CONTROL METHOD OF PROFILE MEASURING APPARATUS

CROSS-REFERENCE TO RELATED APPLICATIONS

The present application claims priority under 35 U.S.C. § 119 of Japanese Application No. 2016-139816, filed on Jul. 14, 2016, the disclosure of which is expressly incorporated by reference herein in its entirety.

BACKGROUND OF THE INVENTION

1. Field of the Invention

The present invention relates to a control method of a profile measuring apparatus.

2. Description of Related Art

Profile measuring apparatuses measuring a profile of a measured object by performing a scanning displacement of a probe along a surface of the measured object are known (see, for example, Japanese Patent Laid-open Publication No. 2008-241420, Japanese Patent Laid-open Publication No. 2013-238573, and Japanese Patent Laid-open Publication No. 2014-021004). Furthermore, a method of performing scanning measurement during autonomous course correction is also known in which a deflection correction vector is calculated continuously so as to keep an amount of deflection of the probe constant (Japanese Patent Laid-open Publication No. 2013-238573). Nominal scanning such as in this example is referred to as an "active nominal scanning measurement."

To provide a simplified introduction of the "active nominal scanning measurement" disclosed in Japanese Patent Laid-open Publication No. 2013-238573, in the "active nominal scanning measurement," a composite vector V as represented in Equation 1 below is treated as a displacement command for the probe. When the probe displaces based on the composite vector V, while the probe (stylus tip) displaces along a predefined scanning path, a scanning measurement of the surface of a work piece is achieved in which the amount of deflection is kept constant (i.e., the "active nominal scanning measurement"). In the following description, the "predefined scanning path" is referred to as a "nominal scanning path."

$$V = Gf \times Vf + Ge \times Ve + Gc \times Vc \quad \text{(Equation 1)}$$

A simplified description of what this equation means follows, with reference to FIG. 1. In FIG. 1, the nominal scanning path is offset from design data of the work piece by a predetermined amount (stylus tip radius r−deflection amount Ep). Also, FIG. 1 depicts a hypothetical case where the actual work piece is slightly offset from the design data.

A vector Vf is a path speed vector. The path speed vector Vf has directionality from an interpolation point (i) lying on the nominal scanning path toward the following interpolation point (i+1). A size of the path speed vector Vf is determined based on a curvature of the nominal scanning path for the interpolation point (i), for example (Japanese Patent Laid-open Publication No. 2014-021004, for example).

A vector Ve is a deflection correction vector, and corrects the deflection amount Ep of the probe to a predetermined standard deflection amount (for example, 0.3 mm). The deflection correction vector Ve is necessarily parallel to a normal line of the surface of the work piece.

A vector Vc is a course correction vector. The course correction vector is parallel to a perpendicular line drawn from a probe position to the nominal scanning path. Gf, Ge, and Gc are, respectively, a scan drive gain, a deflection correction gain, and a course correction gain.

When controlling displacement of the probe with the composite speed vector V according to Equation 1, active nominal scanning measurement is achieved. However, control may become unstable due to the direction of each vector. For example, in the case of FIG. 1, the course correction vector Vc and the deflection correction vector Ve are oriented in opposite directions. Therefore, movement of a probe 230 may begin to oscillate.

In this regard, Japanese Patent Laid-open Publication No. 2013-238573 is configured such that values of Gf, Ge, and Gc are each adjusted as appropriate by a function f1(C,E), f2(E), and f3(C), respectively. However, when Ge or Gc are made smaller in order to inhibit the oscillating behavior, the composite vector V is of course also made smaller. When this happens, a separate issue arises in which course correction performance and deflection correction performance are diminished. Accordingly, course correction performance and control stability cannot both be achieved.

SUMMARY OF THE INVENTION

The present invention provides a control method of a profile measuring apparatus capable of achieving both course correction performance and control stability.

The control method of the profile measuring apparatus according to the present invention is a control method of a profile measuring apparatus that includes a probe having a stylus tip at a distal end and a displacement mechanism displacing the probe, the profile measuring apparatus detecting contact between the stylus tip and a surface of a work piece, and measuring a profile of the work piece. The control method finds a scanning path along which the stylus tip is displaced based on design data of the work piece and, while controlling a deflection amount of the probe toward the work piece to maintain a standard deflection amount, displaces the stylus tip along the scanning path; and, in doing so, the control method generates a probe displacement command according to a composite speed vector V represented by the following equation.

$$\text{Composite speed vector } V = Gf \cdot Vf + Ge \cdot Ve + sg(p) \cdot Gc \cdot Vc2$$

In this equation, the path speed vector Vf is a vector along which the probe is displaced along the scanning path. The deflection correction vector Ve is a vector maintaining the deflection amount of the probe toward the work piece at the standard deflection amount. A second course correction vector Vc2 is represented by (Vc1·q)q. A first course correction vector Vc1 is a vector in a direction correcting the probe position such that the stylus tip is oriented along a scanning course. A course correction direction vector q is a vector given by a vector product of the normal line of the surface of the work piece and the path speed vector Vf. When the normal direction of a measured surface, which is calculated based on the design data of the work piece, is defined as a nominal normal direction vector Nw, p is a scalar product of the second course correction vector Vc2 and the nominal normal direction vector Nw, and a mathematical sign determination function sg(p) is a function returning +1 or −1 in accordance with a value of p. Gf, Ge, and Gc may be any desired coefficient.

In the present invention, preferably, the value of the mathematical sign determination function sg(p) is +1 when the scalar product p of the second course correction vector Vc2 and the nominal normal direction vector Nw is at least 0, and is −1 when the scalar product p of the second course correction vector Vc2 and the nominal normal direction vector Nw is less than 0.

In the present invention, preferably, during calculation of the scanning path along which the stylus tip is displaced based on the design data of the work piece, the scanning path is divided into a plurality of segments and an average normal direction vector Nw for the measured surface is calculated for each segment.

A control program of the profile measuring apparatus according to the present invention runs the control method of the profile measuring apparatus on a computer.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIG. 11 illustrates a comparative example;

DETAILED DESCRIPTION OF THE INVENTION

Figure 1:
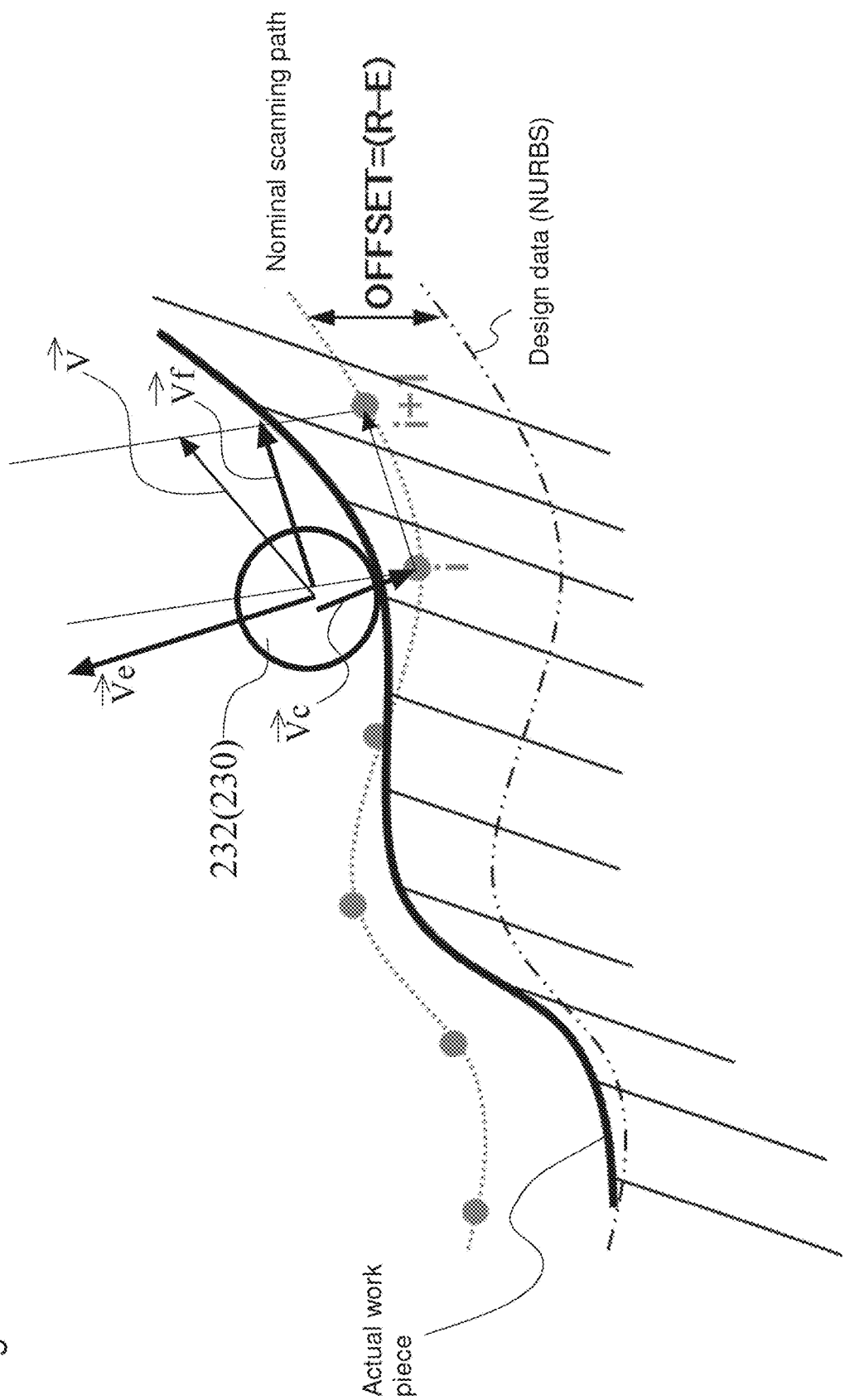
FIG. 1 illustrates a background art example of various components of a composite speed vector V.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

A description of embodiments of the present invention is given with reference to the drawings and to the reference numerals assigned to each component in the drawings.

First Embodiment

A first embodiment of the present invention is described. A basic operation procedure of active nominal scanning measurement has already been disclosed in other documents (see, for example, FIG. 3 of Japanese Patent Laid-open Publication No. 2008-241420), and therefore the following description discusses generation of a composite speed vector V, which is a primary consideration of the present invention.

Figure 2:
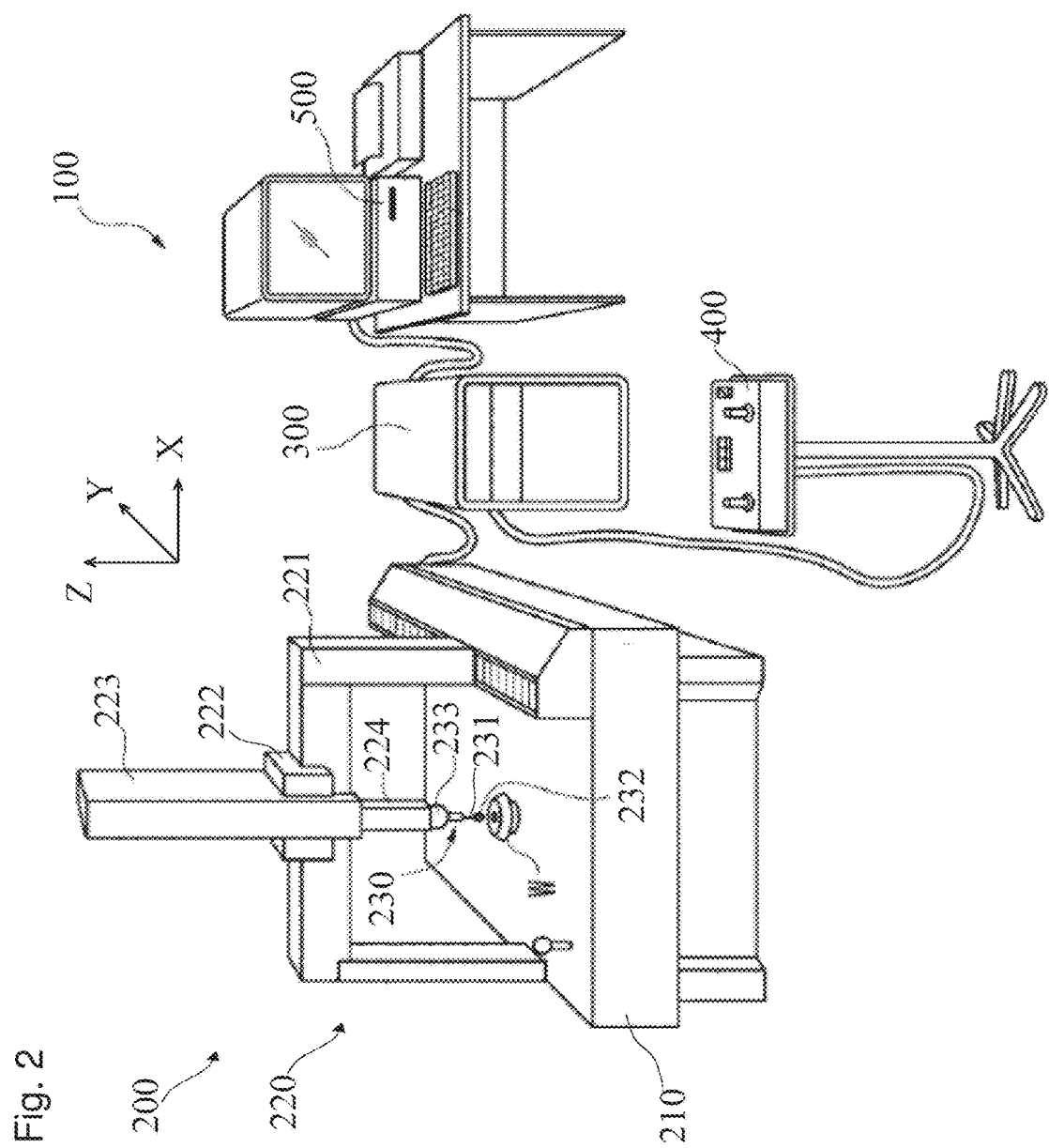
FIG. 2 illustrates an overall configuration of a profile measuring system.

Before beginning, a basic configuration of a profile measuring system 100 is briefly described here. FIG. 2 illustrates an overall configuration of the profile measuring system 100. The profile measuring system 100 includes a coordinate measuring machine 200, a motion controller 300 controlling drive of the coordinate measuring machine 200, and a host computer 500 controlling the motion controller 300 and executing necessary data processing.

The coordinate measuring machine 200 includes a base 210, a displacement mechanism 220, and a probe 230.

The displacement mechanism 220 includes a gate-shaped Y slider 221 provided so as to be capable of sliding above the base 210 in a Y direction, an X slider 222 sliding along a beam in an X direction of the Y slider 221, a Z axis column 223 fixated to the X slider 222, and a Z spindle 224 rising and lowering in a Z direction inside the Z axis column 223.

The Y slider 221, X slider 222, and Z spindle 224 each have a drive motor (not shown in the drawings) and an encoder (not shown in the drawings) attached thereto. Each drive motor is drive controlled by a drive control signal from the motion controller 300. The encoder detects a displacement amount for each of the Y slider 221, X slider 222, and Z spindle 224 and outputs detection values to the motion controller 300. The probe 230 is mounted to a bottom end of the Z spindle 224.

The probe 230 includes a stylus 231 having a stylus tip 232 on a distal end (−Z axis direction side) and a supporter 233 supporting a base end (+Z axis direction side) of the stylus 231. The stylus tip 232 is spherical and comes in contact with a measured object W.

When an outside force is applied to the stylus 231 (in other words, when the stylus tip 232 is in direct contact with the measured object W), the supporter 233 supports the stylus 231 so as to enable displacement of the stylus 231 within a fixed range in each of the X, Y, and Z axis directions. Further, the supporter 233 includes a probe sensor (not shown in the drawings) detecting a position of the stylus 231 in each axis direction. The probe sensor outputs the detection value to the motion controller 300.

Configuration of Host Computer 500

Figure 3:
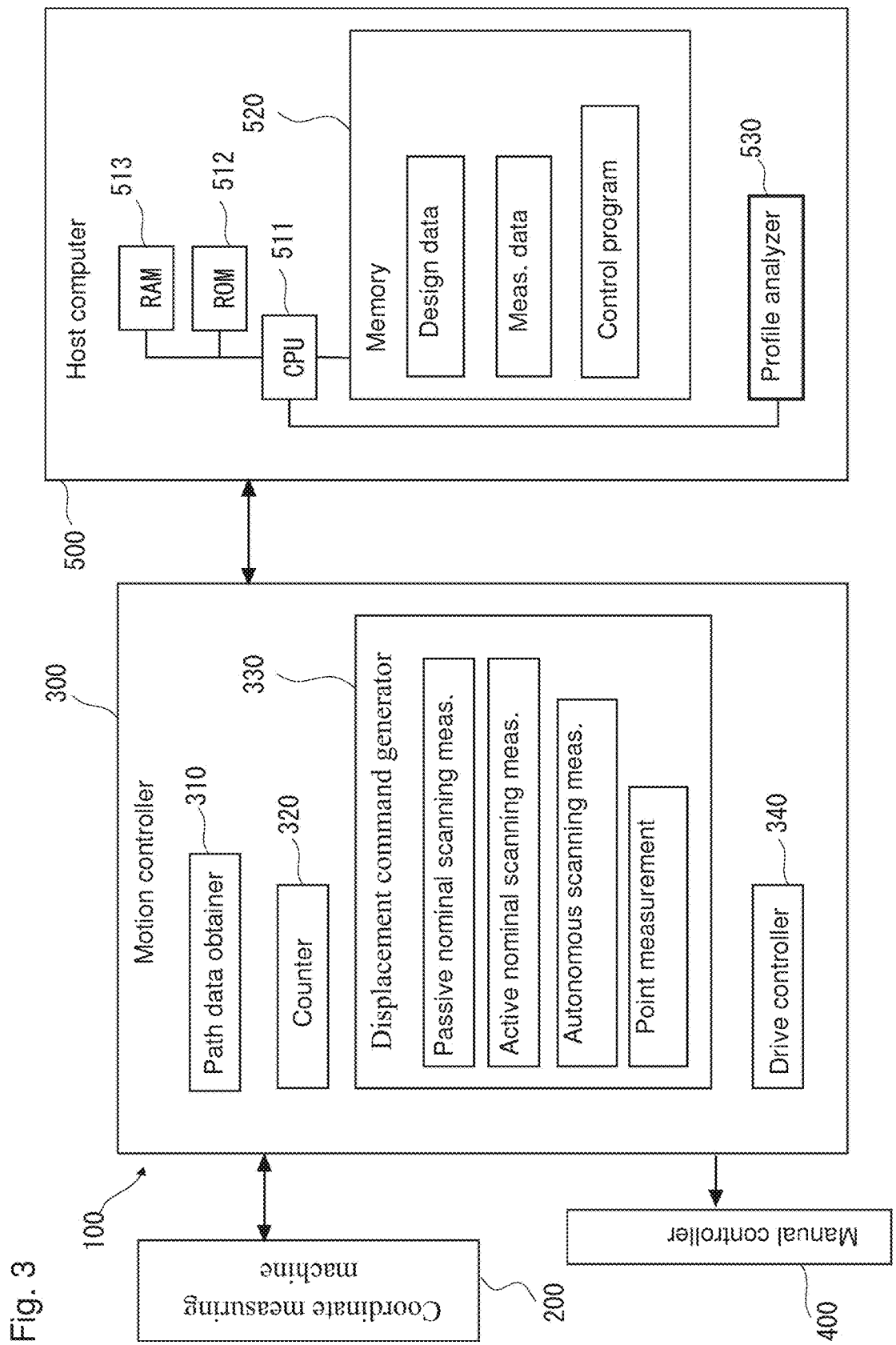
FIG. 3 is a functional block diagram illustrating a host computer and a motion controller.

FIG. 3 is a functional block diagram illustrating the host computer 500 and the motion controller 300. The host computer 500 is configured to include a CPU 511 (Central Processing Unit) and a memory, for example, and controls the coordinate measuring machine 200 via the motion controller 300. An output device (e.g., a display or a printer) and an input device (e.g., a keyboard or a mouse) are connected to the host computer 500 as required.

The host computer 500 further includes a memory 520 and a profile analyzer 530. The memory 520 stores design data (such as CAD data and NURBS data) related to a profile of the measured object (work piece) W; measurement data obtained from measurements; and a measurement control program controlling an overall measurement operation.

The profile analyzer 530 performs a profile analysis by calculating surface profile data of the measured object W based on measurement data output from the motion controller 300 and finding errors, distortions, and the like in the calculated surface profile of the measured object W. In addition, the profile analyzer 530 handles calculation processing which calculates a "nominal scanning path" using the design data (such as CAD data and NURBS data). One aspect of the present embodiment improves the "nominal scanning path."

A scanning measurement path (nominal scanning path) must be prepared ahead of time for scanning measurements. However, what is referred to in the present embodiment as a scanning measurement path (nominal scanning path) is not simply "curve" data as in the conventional art, but instead also refers to path surface data that further includes data for a normal line of a measured surface. Specifically, the "nominal scanning path" of the present embodiment is a curved line path of a scanning measurement to which data for the normal line is added.

Calculation of the nominal scanning path is now described. The profile analyzer 530 receives CAD data (for example, NURBS (Non-Uniform Rational B-Spline) data) that includes path data from an external CAD system or the like and converts the CAD data into dot set data. The data for each point is data combining coordinate values (x, y, z) and normal directions (P, Q, R). (In other words, x, y, z, P, Q, R.) In the instant specification, for the purposes of the description that follows, dot set data having data for (x, y, z, P, Q, R) is referred to as contour point data.

Next, the coordinate value at each point is offset by a predetermined amount in the normal direction. Specifically, the predetermined amount is defined as a stylus tip radius r–a deflection amount Ep. The dot set data obtained in this way is designated as offset contour point data. Also, data for the normal directions (P, Q, R) is of course also included at the base of the offset contour point data. When the coordinate values (x, y, z) of the contour point data are offset and these offset coordinates are expressed by (x', y', z'), the offset contour point data is point set data having data for (x', y', z', P, Q, R).

Then, the profile analyzer 530 converts the offset contour point data to a group of predetermined order polynomial curves. In this example, a cubic function is used as the polynomial and the group of curves is referred to as PCC curves (Parametric Cubic Curves). The offset contour point data is point set data having the (x', y', z', P, Q, R) data. However, data for the normal line of each point is not required for calculation of a PCC curve, and the PCC curve is instead calculated using only the coordinate values (x', y', z'). Further, the profile analyzer 530 appropriately divides the PCC curve to yield a group of divided PCC curves. The present embodiment does not especially limit where the PCC curve is divided. For example, the PCC curve may be divided at fixed length intervals, or may be divided near an inflection point in a case where a curvature changes in excess of some threshold value. The group of divided PCC curves is a set of curves and, in this sense alone, is similar to the nominal scanning path of the conventional art.

In the present embodiment, data for a normal line is further appended as data for the nominal scanning path. The profile analyzer 530 calculates an average normal direction for each segment of the divided PCC curve. Because the data for the normal line is also included in the offset contour point data, a normal vector for each coordinate is composited and then, by carrying out a division operation, an average normal vector Nw for each segment is found. The average normal direction calculated for each segment of the divided PCC curve is labeled a "nominal normal direction."

Because the PCC curve (scanning measurement path) itself is simply a line, there is no normal line for the line. However, a surface to be measured does, of course, have a normal line, and data for an orientation (normal line) of the surface is included in the CAD data, which is the design data for a work piece (measured object). This means, in other words, that as a separate task from the calculation of the PCC curve, the profile analyzer 530 extracts the normal line data from the offset contour point data and finds the average normal line (nominal normal direction) for each segment.

Figure 4:
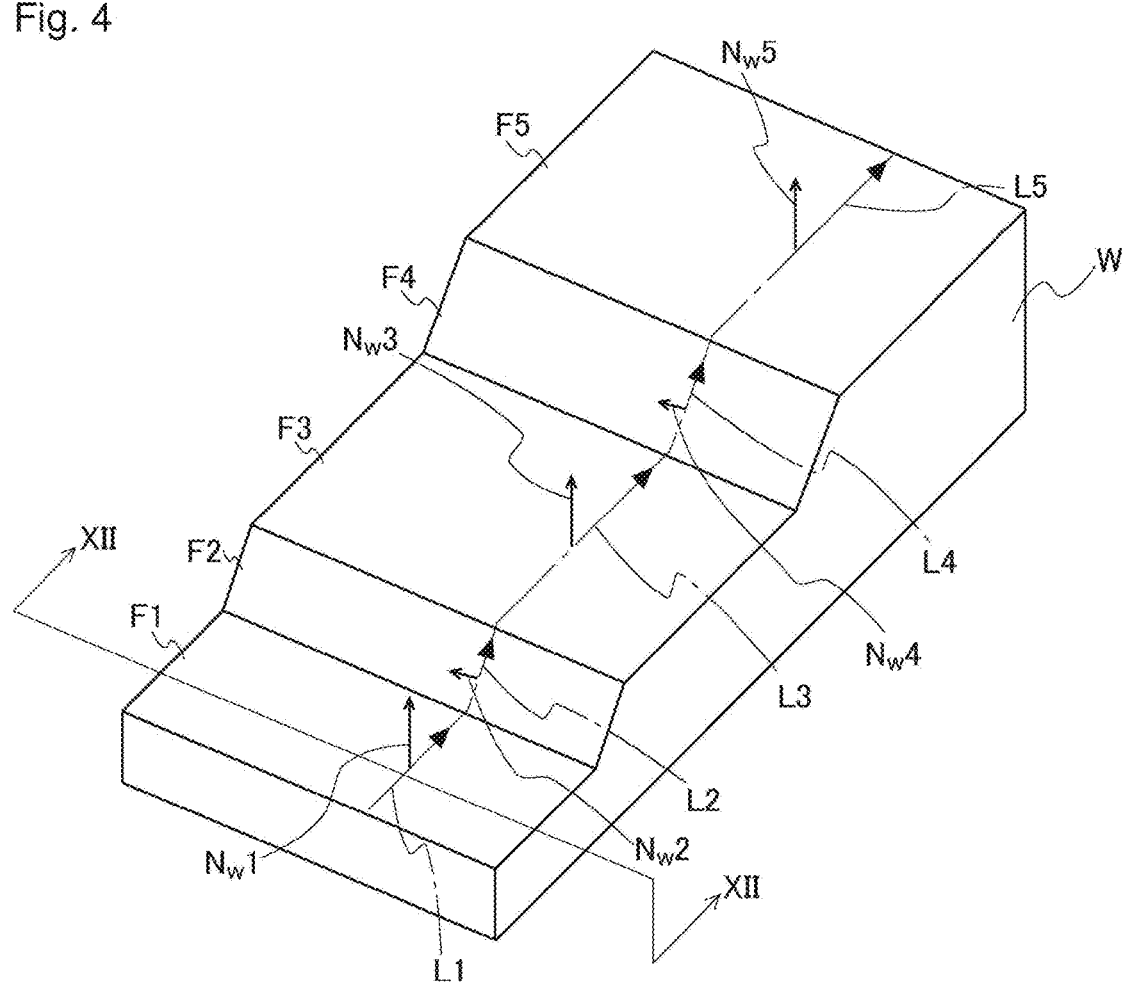
FIG. 4 illustrates an example of a nominal scanning path and a nominal normal direction vector relative to a measured object.

For example, the measured object W shown in FIG. 4, which has a stepped shape, can be thought of as having a path where scanning measurement is performed, in order, along a bottom step surface F1, a bottom inclined surface F2, a middle step surface F3, a top inclined surface F4, and a top step surface F5 as if climbing the steps. The PCC curve which is the path along which scanning measurement of the bottom step surface F1 is performed (in this example, a straight line) is referred to as a first segment path L1, the PCC curve which is the path along which scanning measurement of the bottom inclined surface F2 is performed (in this example, a straight line) is referred to as a second segment path L2, and so on. The normal direction of the first segment path L1 refers to a normal direction Nw1 of the bottom step surface F1. Similarly, the normal direction of the second segment path L2 refers to a normal direction Nw2 of the bottom inclined surface F2. There is no "normal line" for the PCC curve (path) itself, but the nominal normal direction is the normal line of the surface to be measured by the PCC curve (path).

Figure 5:
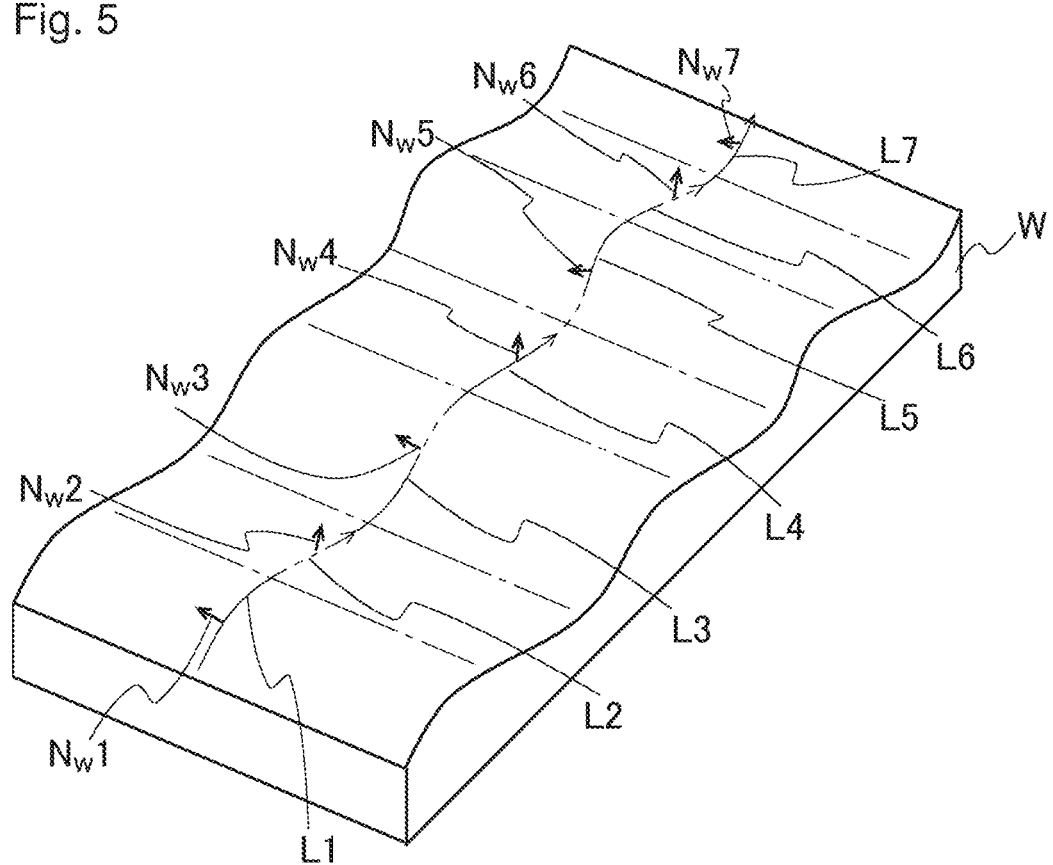
FIG. 5 illustrates an example of a nominal scanning path and a nominal normal direction vector relative to a measured object.

Another example follows, to ensure clarity. As shown in FIG. 5, given a measured object designed to have an undulating surface, a path (PCC curve) is considered along which scanning measurement of the surface is to be performed. Starting from the left, the PCC curve is divided appropriately, and the divided PCC curves are designated as the first segment path L1, the second segment path L2, and so on. Taking the first segment path L1 under consideration, for example, the surface to be measured by the first segment path L1 is curved, and therefore the orientation of the normal line of the surface at each point along the path differs. However, an average orientation of the normal lines in this segment can be calculated. The average normal vector Nw calculated in this way is a nominal normal direction vector Nwi for each segment path. In addition, the group of divided PCC curves and the nominal normal direction vector Nw of each segment are paired, thereby obtaining the "nominal scanning path."

Configuration of Motion Controller 300

The motion controller 300 includes a path data obtainer 310, a counter 320, a displacement command generator 330, and a drive controller 340.

The path data obtainer 310 obtains nominal scanning path data from the host computer 500. The counter 320 counts detection signals output from the encoder and measures an amount of displacement of each slider. In addition, the counter 320 counts the detection signals output from each of the probe 230 sensors to measure the amount of displacement of the probe 230 (stylus 231). From the measured displacement of the sliders and the probe 230, a coordinate position PP of the stylus tip 232 (hereafter, probe position PP) is obtained. In addition, from the displacement (detection values of the probe sensors (Px, Py, and Pz)) of the stylus 231 measured by the counter 320, an amount of deflection (absolute value of a vector Ep) of the stylus tip 232 is obtained.

The displacement command generator 330 calculates a displacement route of the probe 230 (stylus tip 232) measuring the surface of the measured object with the probe 230 (stylus tip 232) and calculates a speed vector along the displacement route. The displacement command generator 330 includes various portions calculating a route corresponding to each measurement method (measurement mode). Specifically, there are four measurement methods: a passive nominal scanning measurement, an active nominal scanning measurement, an autonomous scanning measurement, and a point measurement. In relation to the present embodiment, the measurement method is the active nominal scanning measurement.

The drive controller 340 performs drive control of each slider based on the displacement vector calculated by the displacement command generator 330.

Further, a manual controller 400 is connected to the motion controller 300. The manual controller 400 includes a joystick and a variety of buttons, receives a manual input operation from a user, and sends an operation command from the user to the motion controller 300. In such a case, the motion controller 300 (drive controller 340) performs the drive control of each slider in accordance with the operation command from the user.

Figure 6:
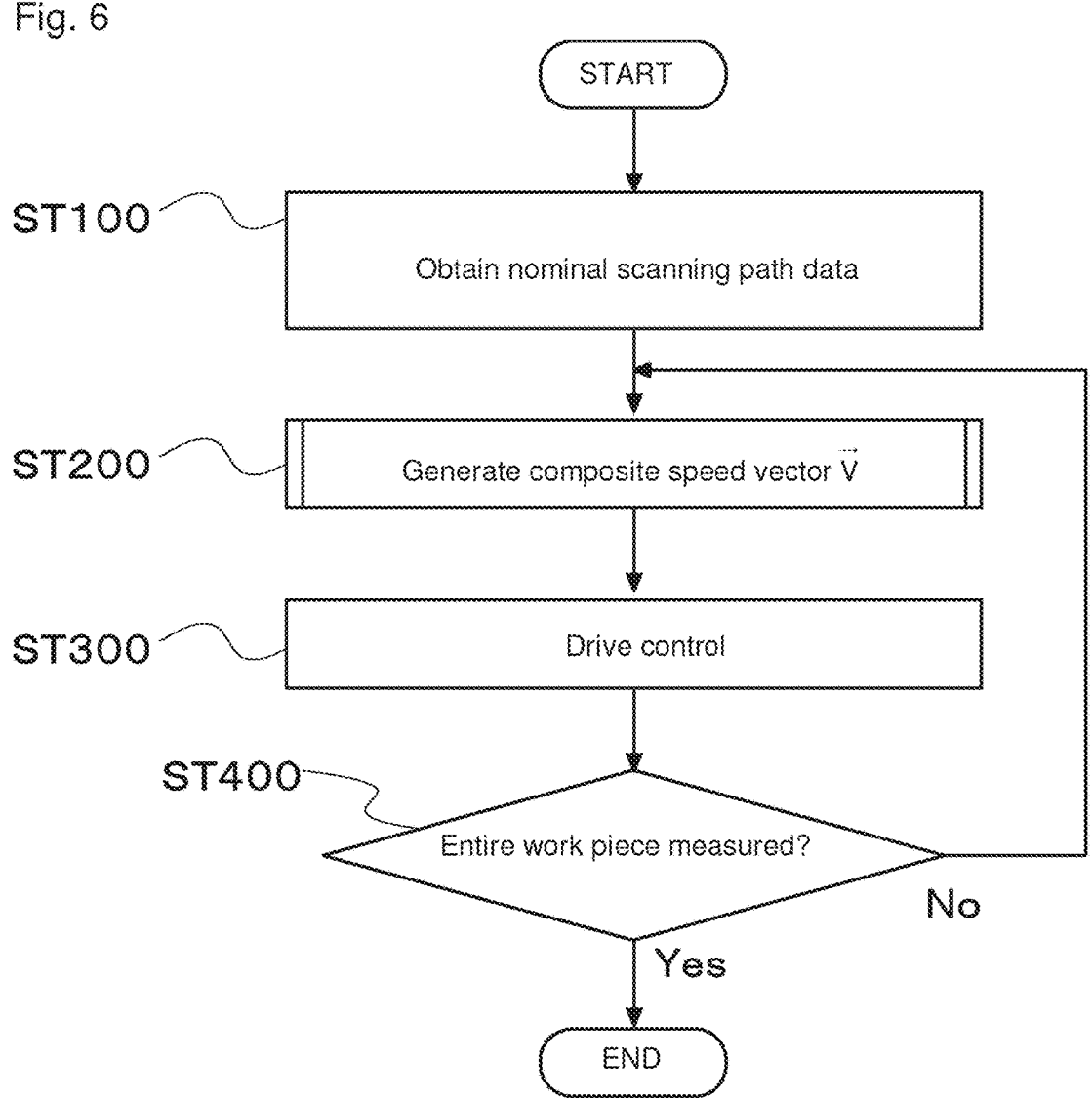
FIG. 6 is a flow chart of overall controls of an active nominal scanning measurement.

FIG. 6 is a flow chart of overall controls of the active nominal scanning measurement. Nominal scanning path data is generated by the host computer 500, and the generated nominal scanning path data is sent to the motion controller 300 (ST100). Then, the motion controller 300 proceeds to generate the composite speed vector V, which is a displacement command for performing the active nominal scanning measurement of the surface of the work piece on the path following the nominal scanning path data (ST200).

Generating Composite Speed Vector V

Figure 7:
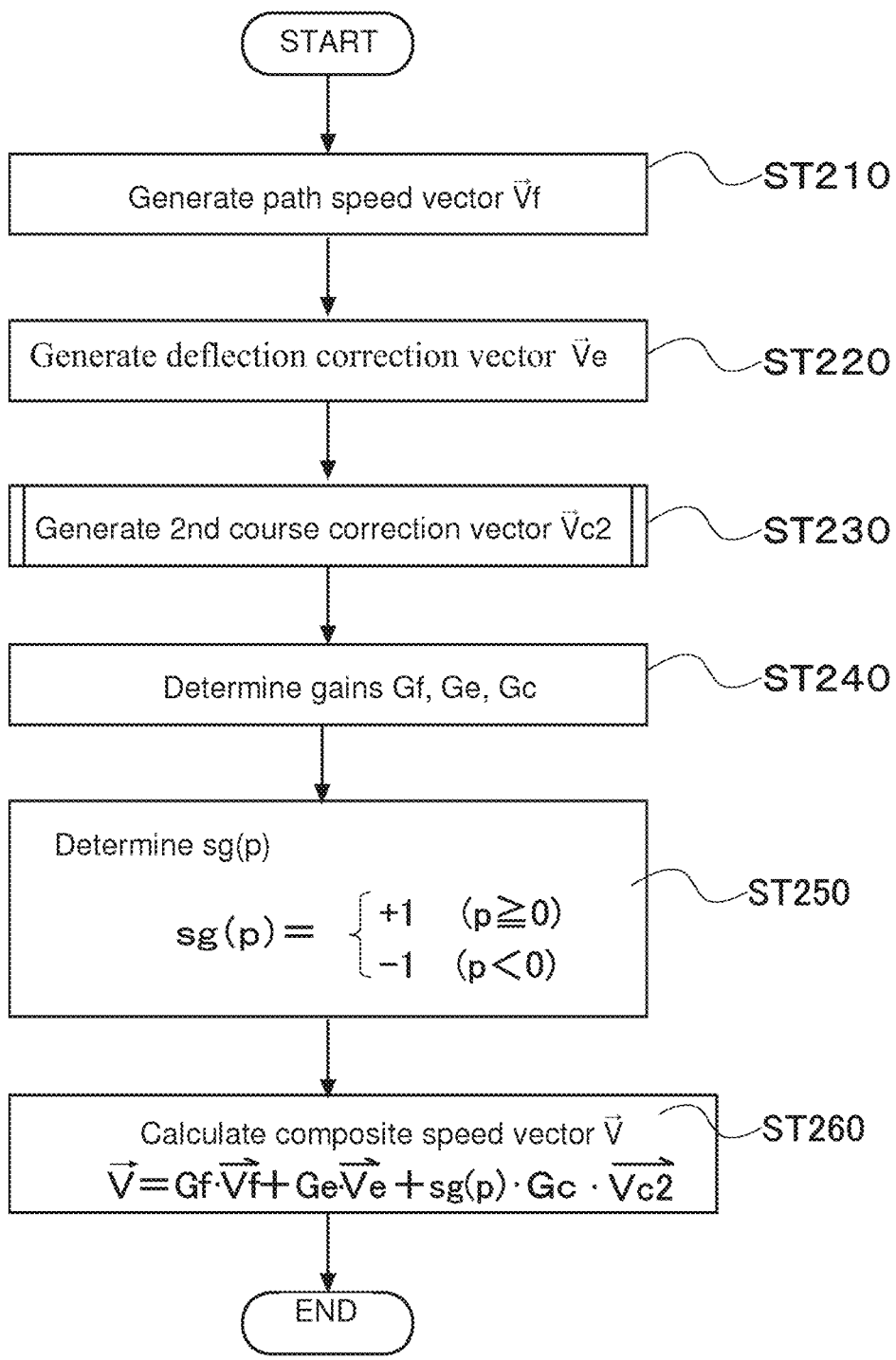
FIG. 7 is a flow chart describing a procedure of generating the composite speed vector V.

A description of how the composite speed vector V is generated follows. FIG. 7 is a flow chart describing a procedure of generating the composite speed vector V. The composite speed vector V is a composite of a path speed vector Vf (ST210), a deflection correction vector Ve (ST220), and a second course correction vector Vc2 (ST230). In this example, the second course correction vector Vc2 (ST230) is not found in the prior art and is introduced for the first time by the present invention.

First, the path speed vector Vf is generated (ST210). When an interpolation point i and the following interpolation point (i+1) are taken as lying on the nominal scanning path, an orientation of the path speed vector Vf is assigned as a direction oriented from the point i to the point (i+1) (see FIG. 8). A size of the path speed vector Vf is defined in accordance with a curvature of the nominal scanning path for the point i, for example (Japanese Patent Laid-open Publication No. 2014-021004). A point P lying on the nominal scanning path is discussed below.

Next, the deflection correction vector Ve is generated (ST220). The deflection correction vector Ve is expressed by the following formula.

[Formula 1]

$$\vec{V}e = K(|\vec{E}p| - E_0)\vec{e}_u \quad \text{(Equation 2)}$$

Ep represents a probe displacement vector obtained from probe output.

$$EP = (xp, yp, zp)$$

Accordingly, a deflection amount |Ep| of the probe is as follows.

[Formula 2]

$$|\vec{E}p| = \sqrt{x_p^2 + y_p^2 + z_p^2} \quad \text{(Equation 3)}$$

Eu represents a unit vector in a probe displacement direction obtained from probe output.

[Formula 3]

$$\vec{e}_u = \vec{E}p / |\vec{E}p| \quad \text{(Equation 4)}$$

Given this, the deflection correction vector Ve, which maintains the deflection amount |Ep| at a reference deflection amount $E_0$, is expressed by Formula 2 above. K may be any desired coefficient.

Figure 8:
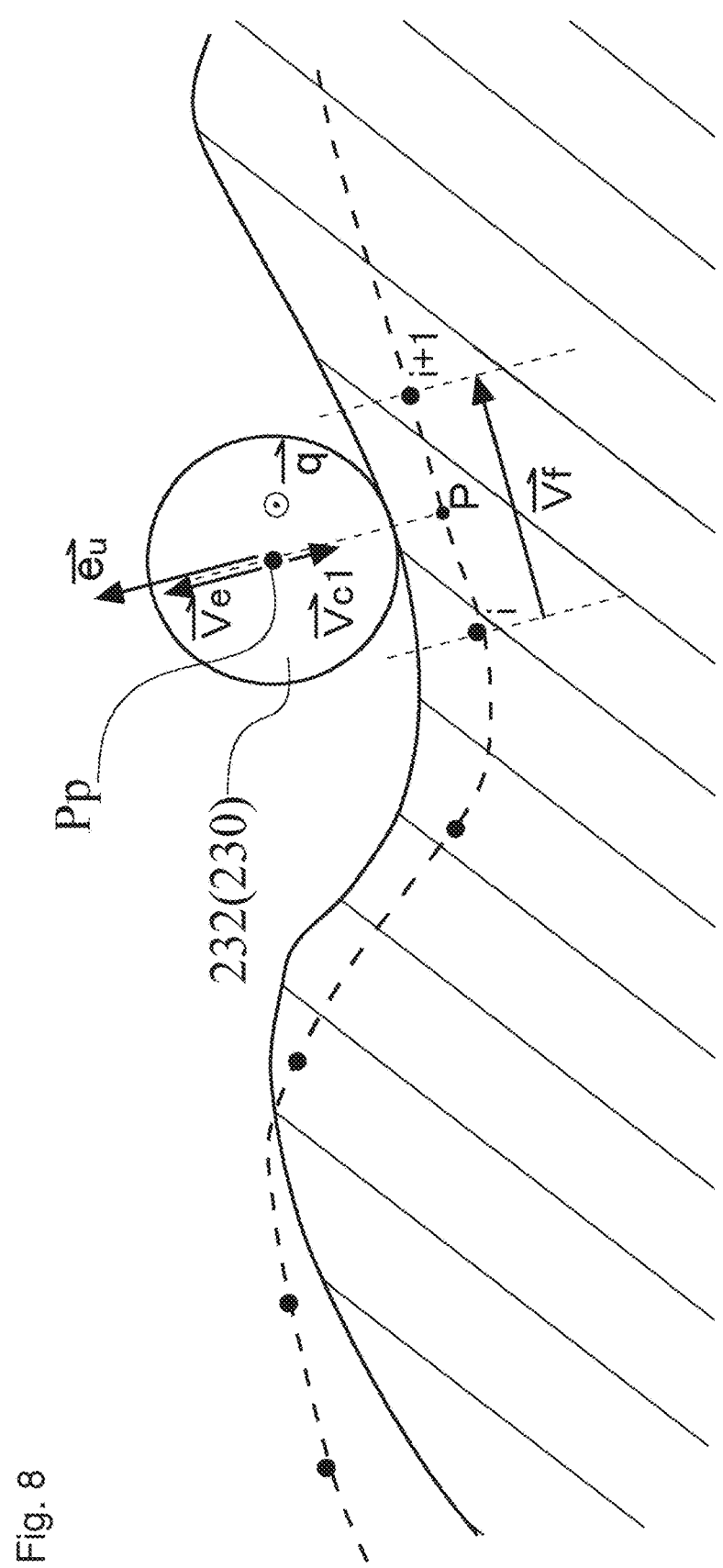
FIG. 8 illustrates the procedure of generating the composite speed vector V.
Figure 9:
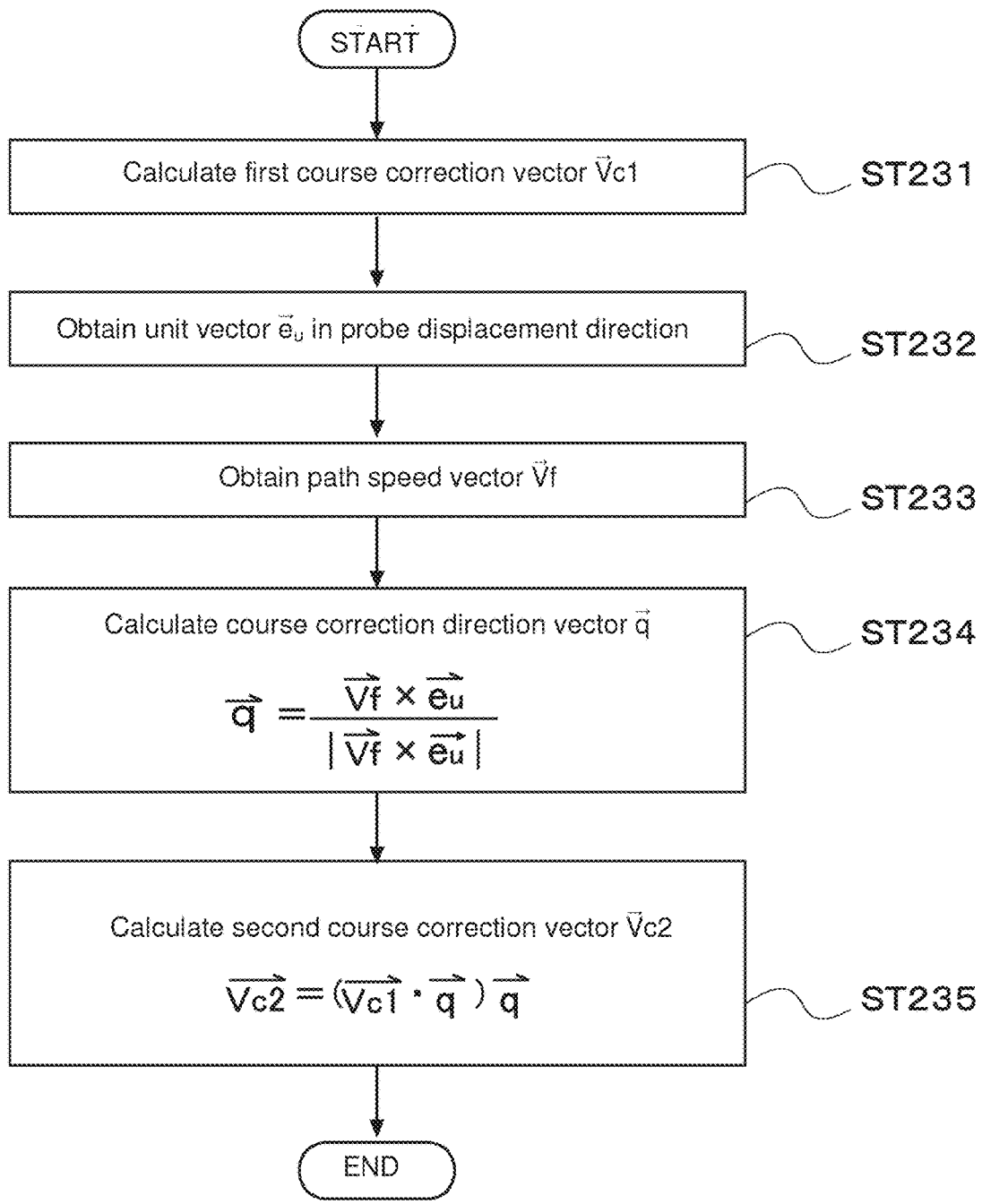
FIG. 9 is a flow chart describing a procedure of generating a second course correction vector Vc2.

Next, the second course correction vector Vc2 is generated (ST230). FIG. 9 is a flow chart describing a procedure of generating the second course correction vector Vc2. The second course correction vector Vc2 is described by following the flow chart of FIG. 9. When finding the second course correction vector Vc2, the first course correction vector Vc1 is calculated first. The first course correction vector Vc1 is the same as a course correction vector Vc in the conventional art (Japanese Patent Laid-open Publication No. 2013-238573) and is merely referred to as the first course correction vector Vc1 for the purposes of this description. A perpendicular line is drawn from the probe position Pp to the nominal scanning path (see FIG. 8). A foot of the perpendicular line is labeled P. A vector in a direction oriented from the probe position Pp to the point P is the first course correction vector Vc1.

In the present embodiment, the first course correction vector Vc1 is not used as-is, but instead only an effective component is extracted and used in course correction. In ST232, a unit vector eu in the probe displacement direction is obtained. The unit vector eu in the probe displacement direction has been described in the generation of the deflection correction vector Ve. Next, the path speed vector Vf is obtained in ST233. A path variable vector Vf has also been described in ST210.

A course correction direction vector q is calculated using the unit vector eu in the probe displacement direction and the path speed vector Vf (ST234). The course correction direction vector q is a unit vector parallel to a vector product of the unit vector eu in the probe displacement direction and the path speed vector Vf. In FIG. 8, when the path speed vector Vf and the unit vector eu in the probe displacement direction lie along the plane of the drawing sheet, the course correction direction vector q is a direction perpendicular to the plane of the drawing sheet.

[Formula 4]

$$\vec{q} = \vec{V}_f \times \vec{e}_u / |\vec{V}_f \times \vec{e}_u| \quad \text{(Formula 4)}$$

In this example, the formula is given as "Vf×eu," but the orientation of an arrow is not important and may instead be "eu×Vf."

The second course correction vector Vc2 refers to a q direction component of the first course correction vector Vc1. In other words, when a scalar product of the first course correction vector Vc1 and the course correction direction vector q is expressed by (Vc1·q), the second course correction vector Vc2 is expressed as follows (ST235).

[Formula 5]

$$\vec{V}c2=(\vec{V}c1\cdot\vec{q})\vec{q} \quad \text{(Formula 5)}$$

Figure 10:
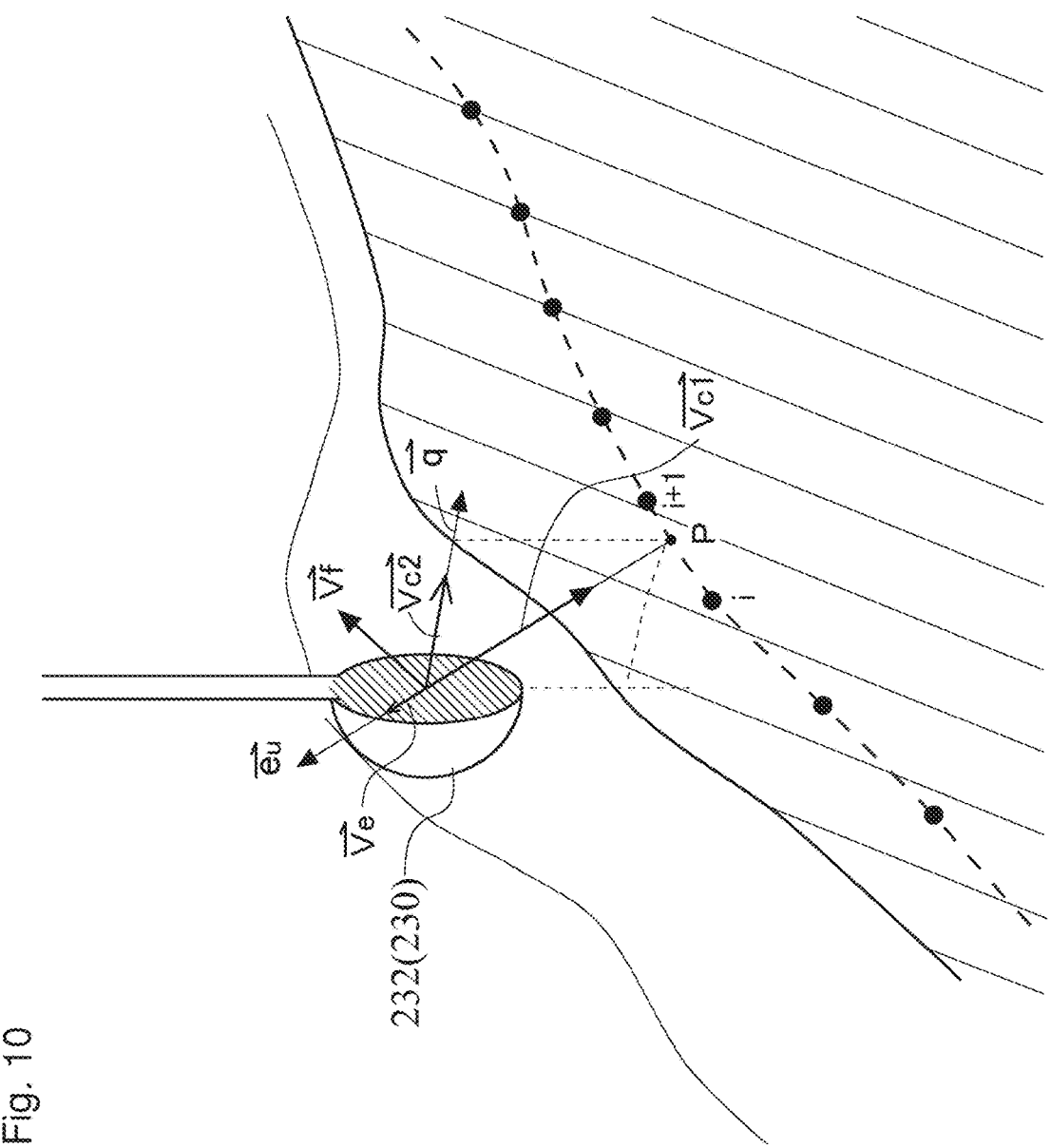
FIG. 10 illustrates a relationship between relative directions of each vector.

The second course correction vector Vc2 is generated in this way. FIG. 10 illustrates an exemplary relationship between relative directions of each vector. The second course correction vector Vc2 can be understood as a direction orthogonal to the unit vector eu in the probe displacement direction and the path speed vector Vf.

Returning to the flow chart of FIG. 7, because the second course correction vector Vc2 is obtained, gains Gf, Ge, and Gc are determined (ST240). The gains Gf, Ge, and Gc are adjusted as appropriate by a pre-determined function for each (for example, Japanese Patent Laid-open Publication No. 2013-238573). For example, when Gf has a significant course offset or deflection offset, Gf is adjusted to reduce the offset.

Next, as ST250, the orientation of the second course correction vector Vc2 is determined by the mathematical sign determination function sg(p). In the mathematical sign determination function sg(p), p is a scalar product of the second course correction vector Vc2 and the nominal normal direction vector Nw.

$$p=(Vc2\cdot Nw)$$

When the scalar product p is 0 or more, a value of the mathematical sign determination function sg(p) is "+1." In other words, when an angle of an opening between the second course correction vector Vc2 and the nominal normal direction vector Nw is less than 90°, the second course correction vector Vc2 is incorporated into the composite speed vector V and the mathematical sign of the second course correction vector Vc2 is maintained.

Meanwhile, when the scalar product p is smaller than 0 (less than 0), the value of the mathematical sign determination function sg(p) is "−1." In other words, when the angle of the opening between the second course correction vector Vc2 and the nominal normal direction vector Nw is 90° or more, the second course correction vector Vc2 is inverted and then incorporated into the composite speed vector V. A role played by the mathematical sign determination function sg(p) is clarified by an exemplary operation described below.

The path speed vector Vf, the deflection correction vector Ve, and the second course correction vector Vc2 are composited to calculate the composite speed vector V (ST260).

When displacement of the probe 230 is controlled based on the composite speed vector V (ST300), active nominal scanning measurement, in which the amount of deflection is constant, is achieved.

Positive effects of using this composite speed vector V are now described. Control using the first course correction vector Vc1, as in the prior art, is simplest in terms of course correction and involves a small amount of calculation, but in some cases behavior of the probe 230 may begin to oscillate. For example, as can be seen in FIGS. 1 and 10, in some cases the first course correction vector Vc1 may have a component oriented in the opposite direction from the deflection correction vector Ve and the path speed vector Vf. In real-world scenarios, the first course correction vector Vc1 and the deflection correction vector Ve acquire opposite orientations and often interfere with each other. This is because the deflection correction vector Ve is constantly changing in response to unevenness on the surface of the work piece.

In a case where the first course correction vector Vc1 has a component oriented in the opposite direction from the deflection correction vector Ve or the path speed vector Vf, when the first course correction vector Vc1, the deflection correction vector Ve, and the path speed vector Vf are composited, the components of each interfere with one another and the behavior of the probe 230 becomes unstable. In such a case, when the gains Gf, Ge, and Gc are skillfully adjusted, the mutual interference of the first course correction vector Vc1, the deflection correction vector Ve, and the path speed vector Vf may conceivably be minimized as much as possible. However, when any one of the gains Gf, Ge, and Gc is reduced in order to reduce the mutual interference, the composite speed vector V itself may also be reduced, and therefore course correction performance is necessarily reduced.

In contrast, in the present embodiment, the second course correction vector Vc2 is configured to have a direction orthogonal to the unit vector eu in the probe displacement direction and the path speed vector Vf. Accordingly, the second course correction vector Vc2 is unlikely to interfere with the deflection correction vector Ve and the path speed vector Vf, and control stabilizes.

The mathematical sign determination function sg(p), which refers to the mathematical sign of the second course correction vector Vc2, is not discussed here. However, whether the value of the mathematical sign determination function sg(p) is +1 or −1, the second course correction vector Vc2 is orthogonal to the deflection correction vector Ve and the path speed vector Vf, and regardless of the mathematical sign, the second course correction vector Vc2 does not interfere with the deflection correction vector Ve or the path speed vector Vf. The role of the mathematical sign of the mathematical sign determination function sg(p) is discussed later.

Comparative Example

In order to further clarify the beneficial effects of the second course correction vector Vc2, a comparative example is now introduced. The comparative example was initially investigated as a potential improvement to the first course correction vector Vc1, but did not reach implementation because a separate issue was discovered. In the comparative example, the first course correction vector Vc1 is referred to as a standard course correction vector Vc1'. The standard course correction vector Vc1' is a vector in which a component orthogonal to the unit vector eu in the displacement direction of the probe is extracted from the first course correction vector Vc1. An example of the directions of each vector is shown within a dashed line boundary in FIG. 11. When expressed as a formula, the following formula results.

[Formula 6]

$$\vec{V}c1'=\vec{V}c1-(\vec{V}c1\cdot\vec{e}_u)\vec{e}_u \quad \text{(Formula 6)}$$

The standard course correction vector Vc1' is a vector orthogonal to the deflection correction vector Ve. Accordingly, the oscillating behavior of the probe 230 caused by the interference between the first course correction vector Vc1 and the deflection correction vector Ve can be eliminated.

However, this gives rise to a different concern. For example, a case such as that shown in FIG. 11 where a probe must climb a hill is representative. In some cases, the standard course correction vector Vc1' may have a component in the opposite direction from the path speed vector Vf. When an offset between the work piece and a design value becomes somewhat large, or a slope of the hill is significant, the standard course correction vector Vc1' may become larger than the path speed vector Vf and the probe 230 may be unable to pass over the hill. For example, when the slope of the hill to be climbed exceeds 20°, control becomes difficult.

In this regard, the second course correction vector Vc2 is orthogonal to not only the deflection correction vector Ve, but also to the path speed vector Vf. Accordingly, stable active nominal scanning measurement can be achieved regardless of the surface profile of the work piece.

Role of Mathematical Sign Determination Function sg(p)

As described above, control of the scanning measurement is stabilized by employing the second course correction vector Vc2. However, by devising a mathematical sign for the second course correction vector Vc2, the inventors have added a further improvement such that measurement is carried out as intended by an operator. First, a case is considered where the mathematical sign determination function sg(p) is not introduced.

Figure 12:
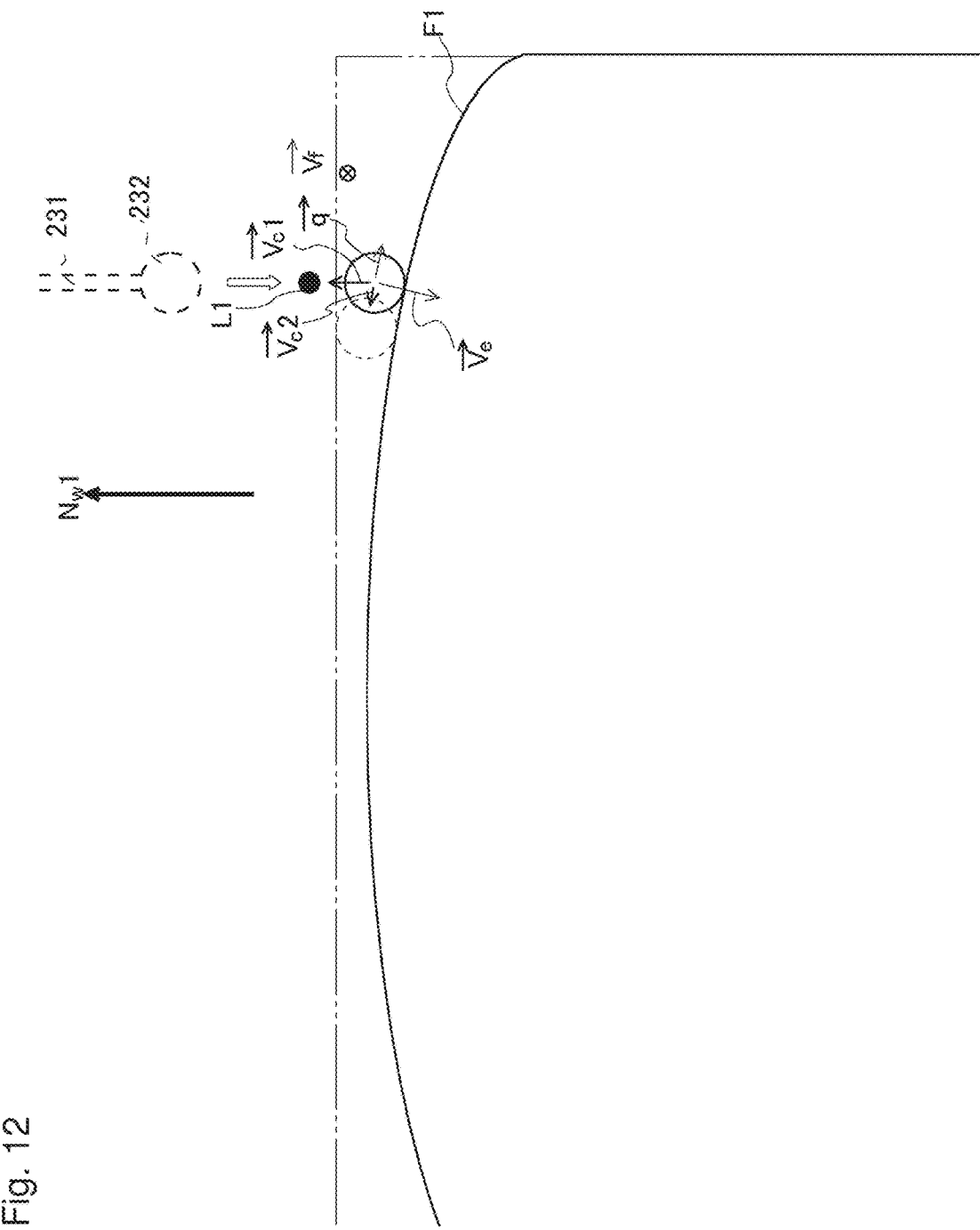
FIG. 12 illustrates an exemplary section of a bottom step surface of the measured object of FIG. 4, along a line XII-XII.

FIG. 12 illustrates a bottom step surface of the measured object of FIG. 4, taken in cross-section along a line XII-XII. Even when the bottom step surface F1 is designed to be flat in the design data, there may be manufacturing errors due to a machine tool, and therefore in the actual work piece W (measured object), the bottom step surface F1 may be ever so slightly curved, for example, as shown in FIG. 12. (The coordinate measuring machine 200 is intended to detect such manufacturing errors by taking measurements.) In the example shown in FIG. 12, a greater amount is carved away than specified in the design data, and furthermore, the surface F1, which is intended to be flat, is instead slightly curved. The manufacturing error (curve) is extremely slight, and would be largely invisible to the operator.

Active nominal scanning measurement is performed on this work piece (measured object) W along the scanning path L, which is prepared ahead of time. The coordinate measuring machine 200 follows a measurement command to bring the probe 230 to the bottom step surface F1 and to then displace the probe 230 along the nominal scanning path L1 while adjusting the deflection amount of the probe 230.

In the cross-sectional view shown in FIG. 12, the direction of each vector configuring the composite speed vector V is investigated. The direction of the path speed vector Vf is a direction lying along the first segment path L1, which is a direction perpendicular to the plane of the drawing sheet in FIG. 12. The direction of the deflection correction vector Ve corrects the deflection amount, and therefore is a direction perpendicular to the surface F1 of the work piece (measured object) W. Because the bottom step surface F1 is curved in this example, the direction of the deflection correction vector Ve is slightly sloped accordingly.

The course correction direction vector q is a direction perpendicular to both the deflection correction vector Ve and the path speed vector Vf, and is therefore a direction lying along the surface F1 of the work piece (measured object) W and a direction rising (or descending) along a curved, inclined surface in FIG. 12. In addition, the direction of the first course correction vector Vc1 is a direction oriented from the center of the stylus tip 232 toward the nominal scanning path L1, and is an upward direction in FIG. 12. The second course correction vector Vc2 is the q direction component of the first course correction vector Vc1, and therefore is a direction rising along an inclined surface of the curve of the work piece W in the example shown in FIG. 12.

Figure 13:
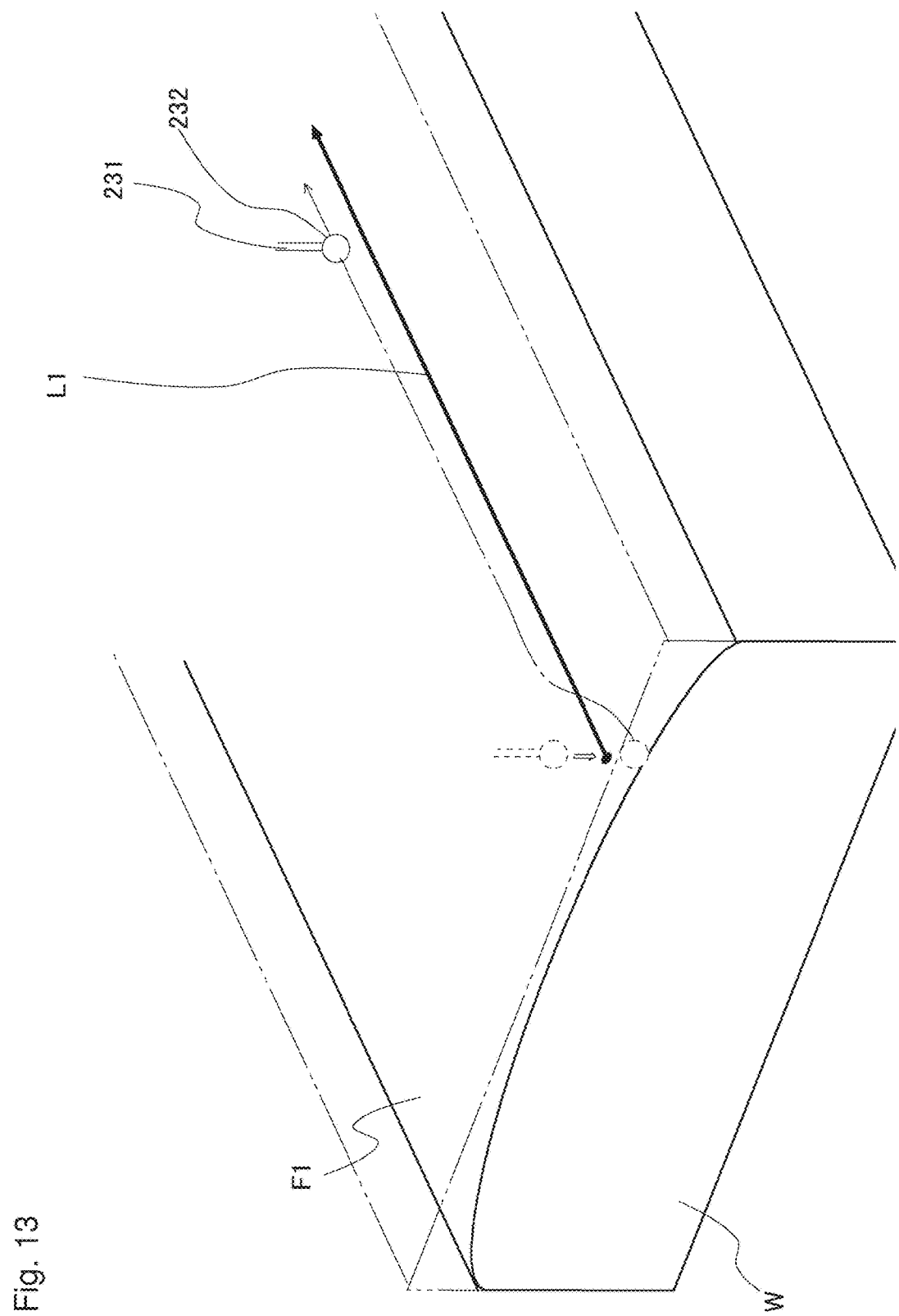
FIG. 13 is an explanatory diagram of an exemplary operation of a probe.

Due to the course correction with the second course correction vector Vc2, the probe 230 is likely to perform the scanning measurement along a line slightly to the left of the path intended by the operator (see FIG. 13). Viewed objectively, the line found by the course correction due to the second course correction vector Vc2 is the measurement path closest to the nominal scanning path L1. In other words, due to the second course correction vector Vc2, the probe 230 displaces on the surface of the work piece so as to adhere most closely to the nominal scanning path L1. In the example of FIG. 12, the work piece is cut to be slightly smaller than the design data, and therefore the probe 230 is offset toward the direction climbing the inclined surface. However, in a case where the work piece W is larger than the design data, the probe 230 would conversely be likely to be offset in the direction descending the inclined surface and come to rest in a location closest to the nominal scanning path L1.

Due to the course correction with the second course correction vector Vc2, the probe 230 may perform the scanning measurement along a path slightly offset from the path intended by the operator, but this may not be such a significant issue when the manufacturing error is small or the curvature of the measured surface is small and sufficiently close to being a flat surface. Even when the actual scanning measurement path is slightly offset from the nominal scanning path, the surface to be measured can be measured, and therefore the objective of the measurement can be met.

Figure 14A:
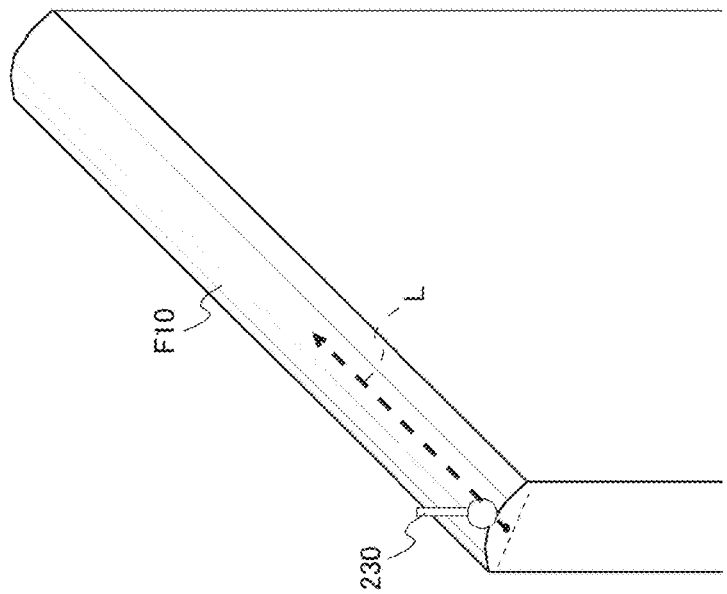
FIGS. 14A and 14B illustrate a role of a mathematical sign determination function sg(p)
Figure 14B:
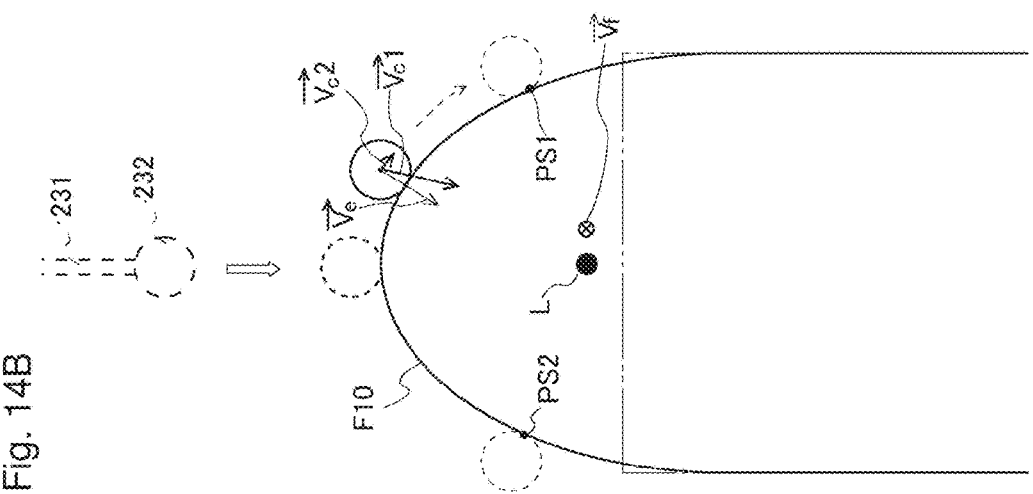

The typical difficulty posed is represented by the following case. As shown in FIG. 14A, there may be a case where, during manufacture, a side surface or end surface of a thin plate or wall is cut more shallowly than specified in the design data and a surface F10 retains a large degree of curvature. When attempting to perform scanning measurement of such an end surface F10 along the pre-defined nominal scanning path L, the probe 230 displaces so as to be closest to the nominal scanning path L, as described above. When doing so, the probe 230 may displace so as to descend relative to the end surface F10 and may measure a location near a side surface (see FIG. 14B). Whether the probe 230 descends to the right (PS1) or left (PS2) is determined by chance.

Figure 15:
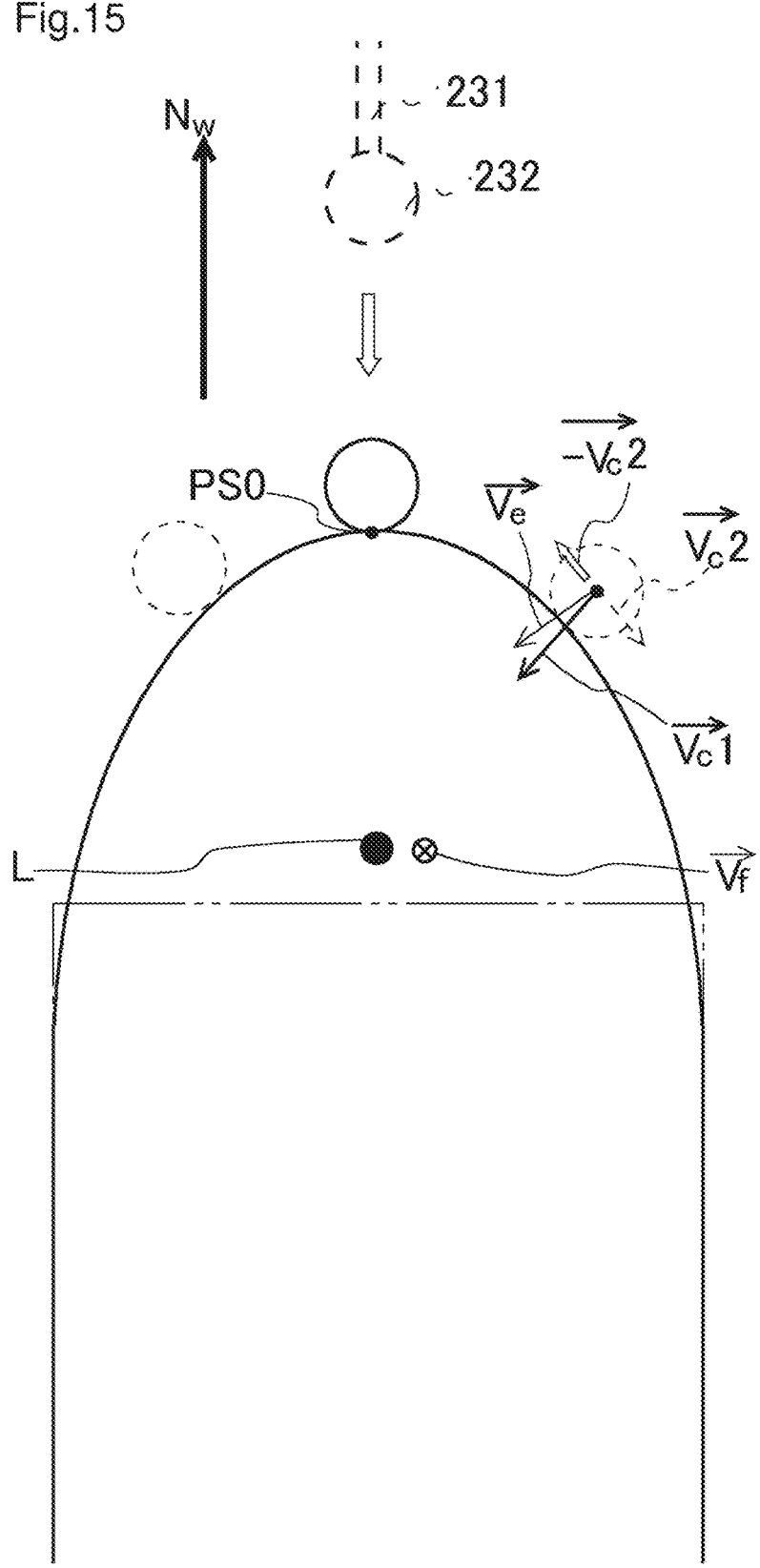
FIG. 15 illustrates a role of the mathematical sign determination function sg(p)

The mathematical sign of the second course correction vector Vc2 is then determined by the mathematical sign determination function sg(p). As can be seen by reference to FIG. 15, when the probe 230 attempts to descend the inclined surface at an angle of opening that exceeds 90° with respect to the nominal normal direction vector Nw, the value of the scalar product p of the nominal normal direction vector Nw and the second course correction vector Vc2 is a negative value. In such a case, the value of the mathematical sign determination function sg(p) is "−1" and the direction of the second course correction vector Vc2 is inverted. In this way, by inverting the orientation of the second course correction vector Vc2, feedback is applied toward a ridge line of the end surface F10 and the probe 230 performs scanning measurement of the profile of the end surface largely without deviating from the ridge line of the end surface F10, which has a large degree of curvature.

Control is not lost even when the orientation of the second course correction vector Vc2 is inverted in this way due to using the second course correction vector Vc2, which does not interfere with the deflection correction vector Ve and the path speed vector Vf. Accordingly, depending on the situation, the orientation of the second course correction vector Vc2 is changed and scanning measurement in accordance with the operator's intent is achieved.

A typical example is described above; however, when determining the mathematical sign of the second course correction vector Vc2 with the mathematical sign determination function sg(p), the scanning path of the probe 230 converges on a location where the deflection correction vector Ve and the nominal normal direction vector Nw are parallel to each other. For example, when performing scanning measurement of the curved surface illustrated in FIGS. 12 to 15 with the control method of the present embodiment, the probe 230 climbs the inclined surface and comes to rest on the ridge line at a location near the nominal scanning path L on the surface being measured. In other words, the probe 230 converges on the location where the deflection correction vector Ve and the nominal normal direction vector Nw are parallel. This enables, through adoption of the present embodiment, the profile (for example, irregularity or undulations) of the measured surface to be measured in a deflection direction of the probe 230 (i.e., direction of the nominal normal direction vector Nw) as intended by the user.

Modifications

Figure 16:
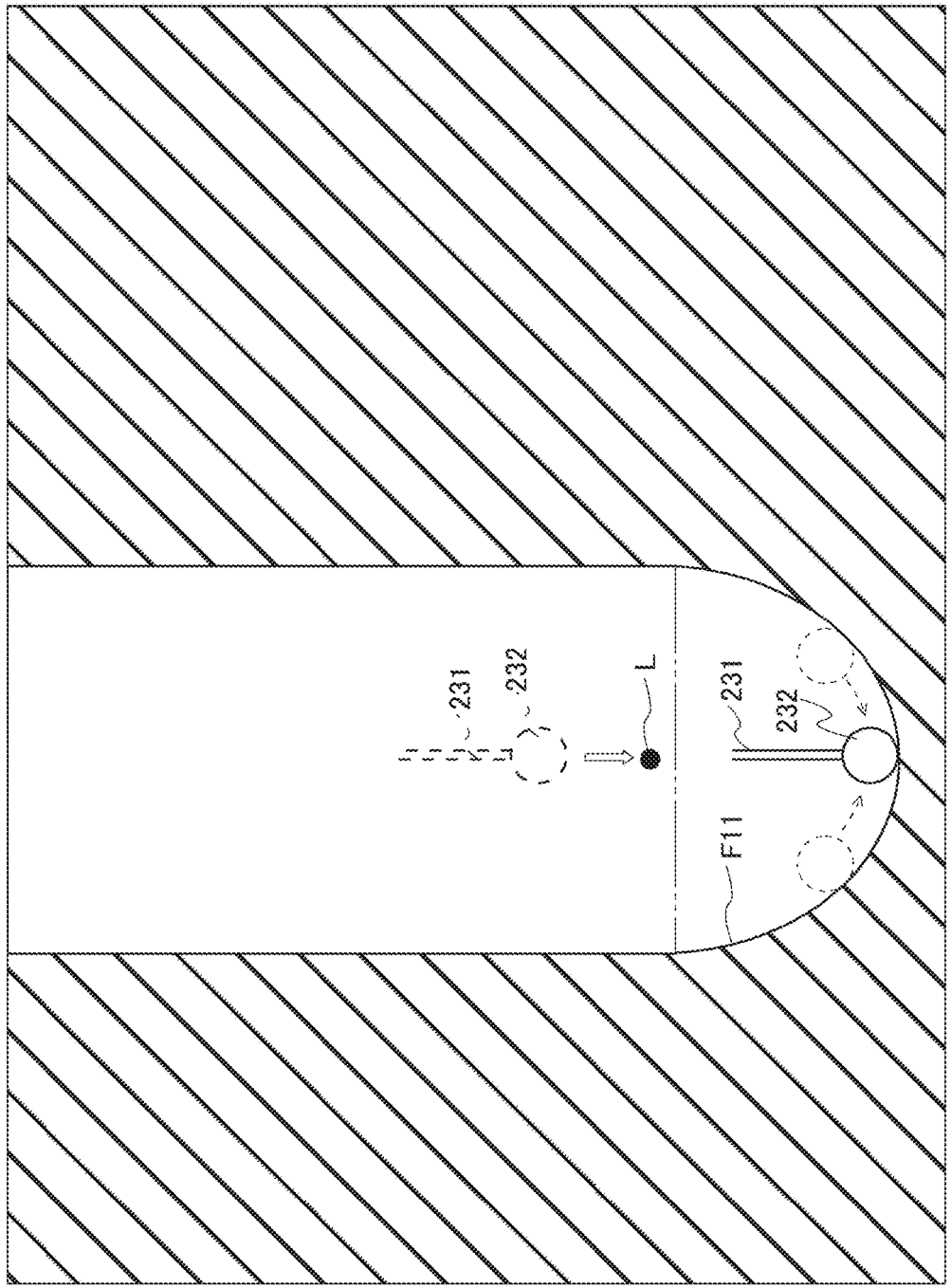
FIG. 16 illustrates a role of the mathematical sign determination function sg(p).

Similarly, when a narrow groove is produced, as shown in FIG. 16, for example, in some cases a greater amount may be carved away than specified in the design data, and a surface F11 having a great degree of curvature may be formed on a bottom surface. In such a case, the mathematical sign of the mathematical sign determination function sg(p) is made opposite. When the value of the scalar product p of the nominal normal direction vector Nw and the second course correction vector Vc2 is a positive value, the value of the mathematical sign determination function sg(p) is "−1" and the direction of the second course correction vector Vc2 is inverted. By doing this, feedback is applied toward the bottom surface of the groove and the probe 230 performs scanning measurement of the profile of the bottom surface F11 largely without deviating from the bottom surface F11 of the groove, which has a large degree of curvature.

Moreover, the present invention is not limited to the embodiments described above, and may be modified as needed without departing from the scope of the present invention.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A control method of a profile measuring apparatus that includes a probe having a stylus head at a distal end and a displacement mechanism displacing the probe, the profile measuring apparatus detecting contact between the stylus head and a surface of a work piece, and measuring a profile of the work piece, the method comprising:

finding a scanning path along which the stylus head is displaced based on design data of the work piece;

while controlling a depression amount of the probe toward the work piece to maintain a standard depression amount, displacing the stylus head along the scanning path;

generating, via a motion controller of the profile measuring apparatus, a probe displacement instruction according to a composite speed vector V represented by the following equation:

composite speed vector $V = Gf \cdot Vf + Ge \cdot Ve + sg(p) \cdot Gc \cdot Vc2$ wherein:

a path speed vector Vf is a vector along which the probe is displaced along the scanning path, a depression correction vector Ve is a vector maintaining the depression amount of the probe toward the work piece at the standard depression amount, a second course correction vector Vc2 is represented by $(Vc1 \cdot q)q$, a first course correction vector Vc1 is a vector in a direction correcting a probe position such that the stylus head is oriented along a scanning course, a course correction direction vector q is a vector given by a vector product of the normal line of the surface of the work piece and the path speed vector Vf, when the normal direction of a measured surface, which is calculated based on the design data of the work piece, is defined as a nominal normal direction vector Nw, p is a scalar product of the second course correction vector Vc2 and the nominal normal direction vector Nw, and a mathematical sign determination function sg(p) is a function returning +1 or −1 in accordance with a value of p, and Gf, Ge, and Gc are each a predetermined coefficient; and displacing the probe in accordance with the generated probe displacement instruction.

2. The control method of the profile measuring apparatus according to claim 1, wherein:

the value of the mathematical sign determination function sg(p) is +1 when the scalar product p of the second course correction vector Vc2 and the nominal normal direction vector Nw is at least 0, and the value of the mathematical sign determination function sg(p) is −1 when the scalar product p of the second course correction vector Vc2 and the nominal normal direction vector Nw is less than 0.

3. The control method of the profile measuring apparatus according to claim 1, wherein during calculation of the scanning path along which the stylus head is displaced based on the design data of the work piece, the scanning path is divided into a plurality of segments, and an average normal direction vector Nw for the measured surface is calculated for each segment.

4. At least one tangible, non-transitory computer-readable medium storing an executable set of instructions for controlling a profile measuring apparatus that includes a probe having a stylus head at a distal end and a displacement mechanism displacing the probe, the profile measuring apparatus detecting contact between the stylus head and a surface of a work piece, and measuring a profile of the work piece, wherein the set of instructions, when executed by a computer processor, cause the computer processor to execute operations comprising:

finding a scanning path along which the stylus head is displaced based on design data of the work piece;

while controlling a depression amount of the probe toward the work piece to maintain a standard depression amount, displacing the stylus head along the scanning path;

generating, via a motion controller of the profile measuring apparatus, a probe displacement instruction according to a composite speed vector V represented by the following equation:

composite speed vector $V = Gf \cdot Vf + Ge \cdot Ve + sg(p) \cdot Gc \cdot Vc2$ wherein:

a path speed vector Vf is a vector along which the probe is displaced along the scanning path, a depression correction vector Ve is a vector maintaining the depression amount of the probe toward the work piece at the standard depression amount, a second course correction vector Vc2 is represented by (Vc1·q)q, a first course correction vector Vc1 is a vector in a direction correcting a probe position such that the stylus head is oriented along a scanning course, a course correction direction vector q is a vector given by a vector product of the normal line of the surface of the work piece and the path speed vector Vf, when the normal direction of a measured surface, which is calculated based on the design data of the work piece, is defined as a nominal normal direction vector Nw, p is a scalar product of the second course correction vector Vc2 and the nominal normal direction vector Nw, and a mathematical sign determination function sg(p) is a function returning +1 or −1 in accordance with a value of p, and Gf, Ge, and Gc are each a predetermined coefficient; and displacing the probe in accordance with the generated probe displacement instruction.

5. The at least one tangible, non-transitory computer-readable medium according to claim 4, wherein:

the value of the mathematical sign determination function sg(p) is +1 when the scalar product p of the second course correction vector Vc2 and the nominal normal direction vector Nw is at least 0, and the value of the mathematical sign determination function sg(p) is −1 when the scalar product p of the second course correction vector Vc2 and the nominal normal direction vector Nw is less than 0.

6. The at least one tangible, non-transitory computer-readable medium according to claim 4, wherein during calculation of the scanning path along which the stylus head is displaced based on the design data of the work piece, the scanning path is divided into a plurality of segments, and an average normal direction vector Nw for the measured surface is calculated for each segment.

* * * * *